United States Patent [19]
Guim et al.

[11] Patent Number: 4,757,250
[45] Date of Patent: Jul. 12, 1988

[54] THREE-CONDUCTOR BOOSTER CABLE ASSEMBLY

[75] Inventors: Raul Guim, Coral Gables; Louis M. Lazo, Miami, both of Fla.

[73] Assignee: SCEP, Inc., Coral Gables, Fla.

[21] Appl. No.: 16,869

[22] Filed: Feb. 20, 1987

[51] Int. Cl.[4] .............................................. H02J 7/00
[52] U.S. Cl. ........................................... 320/25; 320/2
[58] Field of Search .................................. 320/2, 25, 26

[56] References Cited

U.S. PATENT DOCUMENTS

| | | | |
|---|---|---|---|
| 4,145,648 | 3/1979 | Zender | 320/25 |
| 4,217,534 | 8/1980 | Cole | 320/25 |
| 4,400,658 | 8/1983 | Yates | 320/26 |
| 4,463,402 | 7/1984 | Cottrell | 320/25 X |
| 4,663,579 | 5/1987 | Yang | 320/26 |

*Primary Examiner*—Patrick R. Salce
*Assistant Examiner*—Anita M. Ault
*Attorney, Agent, or Firm*—John H. Faro

[57] ABSTRACT

A three-conductor booster cable assembly is disclosed for connection of a source of DC power to the terminals of a battery requiring recharging. The uniqueness of this assembly is based upon a combination of features including (a) modification of the terminal clamps on the cable ends to insure that the opposing jaws of each clamp are and remain open when not in contact with the positive terminals of either the battery or power source, (b) the provision of two separate conductors for connection of the positive terminal clamps to the positive terminal of the power source to the positive terminal of the battery to be recharged and (c) control circuitry specific for a three-conductor booster cable assembly. Because of these and other features, the control circuit logic is now capable of preventing arcing of the positive terminal clamps should they become inadvertently disconnected from the terminals once the transfer of power from the power source to the battery has been initiated. This battery cable assembly is, thus, particularly useful in charging of batteries which are located in confined, relatively unventilated areas, (i.e., engine compartment of an automobile or boat).

7 Claims, 3 Drawing Sheets

THREE-CONDUCTOR BOOSTER CABLE ASSEMBLY

BACKGROUND OF THE INVENTION

1. Field of the Invention

This invention is directed to an apparatus and to a method. More specifically, this invention relates to a three-conductor booster cable assembly and to a method for real-time control of the power transfer through the booster cable assembly from a power source to a battery which is being charged from the power source.

2. Description of the Prior Art

The potential hazards in the use of booster cables for charging of lead-acid batteries, the type commonly found in automobiles, boats and other vehicles, is fully appreciated by the prior art. Batteries of this type internally generate hydrogen and oxygen gases (at the plates of the battery) which are highly explosive. In the event these gases escape and collect in the vicinity of the terminals of the battery, they can be ignited by any sparks or arcing at the terminal. Care must, thus, be taken to maintain the areas around the battery free from sparks, etc. in order to prevent combustion of these gases. The effect of such combustion would be to rupture the batatery casing, causing the electrolyte (sulfuric acid and water) to be sprayed or spilled over any individual or object in the immediate vicinity, with potentially serious injuries resulting.

The jumper cables which are commonly used for jumpering batteries consist of two (2) conductors. These cables are typically accompanied by specified hook-up instructions from the manufacturer in order to reduce the danger of arcing at the battery terminals. Notwithstanding the precautions taken by both the manufacturer of such cables and by the user, the potential for ignition of the explosive gases in the vicinity of the battery terminals is everpresent.

Modification to conventional two-conductor cable design has been attempted to reduce this potential hazard. The evolution of cable design over the years has been both imaginative and varied. These designs generally involve the provision of some physical or electronic device to prevent or interrupt the flow of current along such cables where the potential for arcing was detected. These electronic devices can themselves be further grouped into two subcategories: (a) electronic devices incorporating safety circuitry along at least one of the conductors of the battery cables to prevent the flow of current through the cables, unless the cables are properly connected, and (b) electronic and/or electromechanical devices incorporating what has been termed "terminal blocks", which permit reversal of incorrectly connected cables to the appropriate polarity conditions.

The following patents are representative of the prior art approaches to providing a resolution to this problem: U.S. Pat. Nos. 3,654,538; 3,659,183; 3,809,993; 4,163,134; 4,166,241; 4,233,552; 4,349,774; 4,463,402; and 4,607,209.

To aid in the understanding of the significance of the contribution of the instant invention, two figures (FIGS. 2 and 3) have been included in this disclosure to illustrate the most relevant prior art. All of the relevant prior art, including the cable assemblies illustrated in FIGS. 2 and 3 are based upon a booster cable consisting of two (2) conductors; one conductor for connection of the positive terminal of the power supply to the positive terminal of the battery, and a second conductor for connection of the negative terminal of the power supply to the negative terminal of the battery. FIG. 2 is a block diagram of the safety circuit of U.S. Pat. No. 4,607,209. In brief, this safety circuit diagram illustrates a normally open relay (208) which has been placed intermediate between two terminal clamps (210, 212) along a common conductor (232, 242). Unless certain conditions are fulfilled, the terminal clamp 210 of cable 232 will remain electrically isolated from terminal clamp 212 which is connected to cable 242, thus preventing current from flowing therebetween. The conditions are such that the clamps of the cables must be connected to the correct terminal polarities of both the power source and the battery to be recharged. The circuit which is illustrated can, of course, work in either direction, that is, cable pair 231/232 can be connected to the power source with cable 241/242 connected to the battery; alternatively, cable pair 231/232 connected to the battery and cable pair 241/242 connected to the power source. For the sake of simplicity, the circuit operation is described assuming that cable pair 232/231 is connected to the power source. The preferred embodiment of control circuitry which is described in the '209 patent contemplates a solenoid as the normally open relay.

Conductor 242 is connected to a polarity indicator (201) as is conductor 232. These polarity indicators (201, 202) alert the user when the cables have been connected to the correct terminal polarities. In the example illustrated in the block diagram, the conditions of the circuit would be satisfied if cable 232 were connected to the positive terminal of the power source and cable 231 were connected to the negative terminal of the power source, and cable 242 were connected to the positive terminal of the battery to be recharged and cable 241 were connected to the negative terminal of the battery to be recharged. The preferred polarity indicators suggested in patent '209 are light emitting diodes. If the cable connections are not properly made, one or both light emitting diodes would not be armed, thus alerting the user to a potential problem.

The logic circuit (206) of the block diagram operates the normally open relay (208). This circuit performs a logic AND function, that is, when the correct connections have been made to the power source and to the battery, the logic circuit will close the relay. Where any of the connections have not been made or have been made incorrectly, the logic circuit will be unable to effect closure of the relay.

While the circuitry of the '209 patent provides safety features not previously available in other prior art systems, additional modification was still needed to prevent arcing at the terminals in those situations in which the user had failed to effect solid physical contact between the cable clamps and the terminals of the battery, or of the power source, at the time of their initial connection.

This shortcoming was remedied by providing additional time delay circuitry (303, 304) which prevents the logic circuit (306) from activation of the normally open relay (308) until some finite period after the cable clamps have been securely affixed to the respective terminals of the battery and the power supply. FIG. 3 is illustrative of an improvement of the booster cable assembly of the '209 patent which addressed the arcing problem during the initial connection of the cable clamps to the terminals of this power supply and battery to be recharged. This improvement to the '209 patent is described in co-pending PCT application, U.S. 86/00876, filed Apr. 25, 1986.

While the imposition of a finite delay between the satisfaction of the requisite conditions for current flow, and the actual closing of the normally open relay, does enhance the safety of the battery cables, it still cannot prevent arcing from occurring, after initial connection of these clamps to the terminals, in the event that one of the cable clamps is inadvertently and unintentionally disconnected from either the positive terminals of the battery or of the power source after flow of current has commenced. Accordingly, further improvement is both desirable and essential in order to protect the user of booster cables against potential ignition of explosive gases in the vicinity of the battery, both at the time of installation of the battery cable and during the actual charging cycle.

OBJECTS OF THE INVENTION

It is the object of this invention to remedy the above as well as related deficiencies in the prior art.

More specifically, it is the principle object of this invention to provide a three-conductor booster cable assembly in which current is automatically and immediately interrupted in real-time upon the deliberate or inadvertent disconnection of a cable connector from a positive terminal of either the power supply or the battery being charged.

It is another object of this invention to provide a three-conductor booster cable assembly having both unique cable connectors and unique control circuitry.

It is still yet another object of this invention to provide a booster cable assembly having the additional ability to limit the current through the cables in the event of a surge from the power supply.

It is an additional object of this invention to provide a method for the immediate interruption of current between the source of a DC charging current and a battery being charged once correct terminal connections have been made and the flow of current has begun.

SUMMARY OF THE INVENTION

The above and related objects are achieved by providing a three-conductor booster cable assembly incorporating unconventional positive terminal clamps at the end of one cable conductor of the assembly. This assembly is further provided with control circuitry having the capability (a) to sense the correct polarity of the connections and effect closure of the power transfer circuit; and, (b) to effect immediate interruption of power transfer in real-time, even after the current has begun to flow, in the event of inadvertent or deliverate removal of one or more of the clamps of the cable from the positive terminal at the power source or at the battery. In the context of this invention, the term "conductor" is intended to describe a cable and its associated electronic circuitry (if any) for connection of a terminal of a power source to a terminal of the battery. The cable connectors intended for connection to the positive terminals of the power source and the battery are unique in that the jaws of each connector are both physically and electrically insulated from one another; and, when not affixed to a positive terminal at the power supply and/or battery, remain in a normally open position.

An additional unique feature of the preferred assembly of this invention involves the addition of surge suppressors to limit the flow of power through the conductors to a predetermined value, thus, further minimizing the potential for arcing.

DESCRIPTION OF THE INVENTION INCLUDING THE PREFERRED EMBODIMENTS

Figure 1:
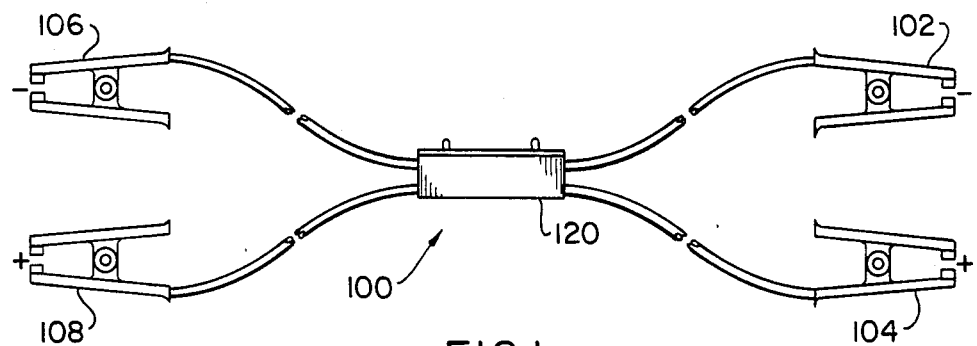
FIG. 1 is a perspective view of a preferred embodiment of the improved booster cable assembly of this invention.
Figure 2:
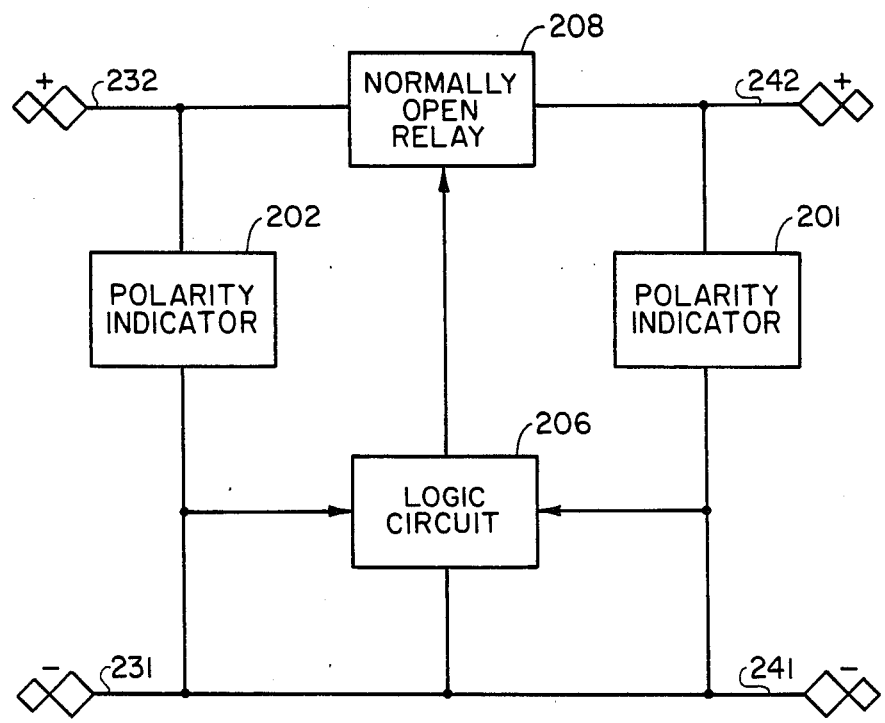
FIG. 2 is a block diagram of the preferred circuit of U.S. Pat. No. 4,607,209.
Figure 3:
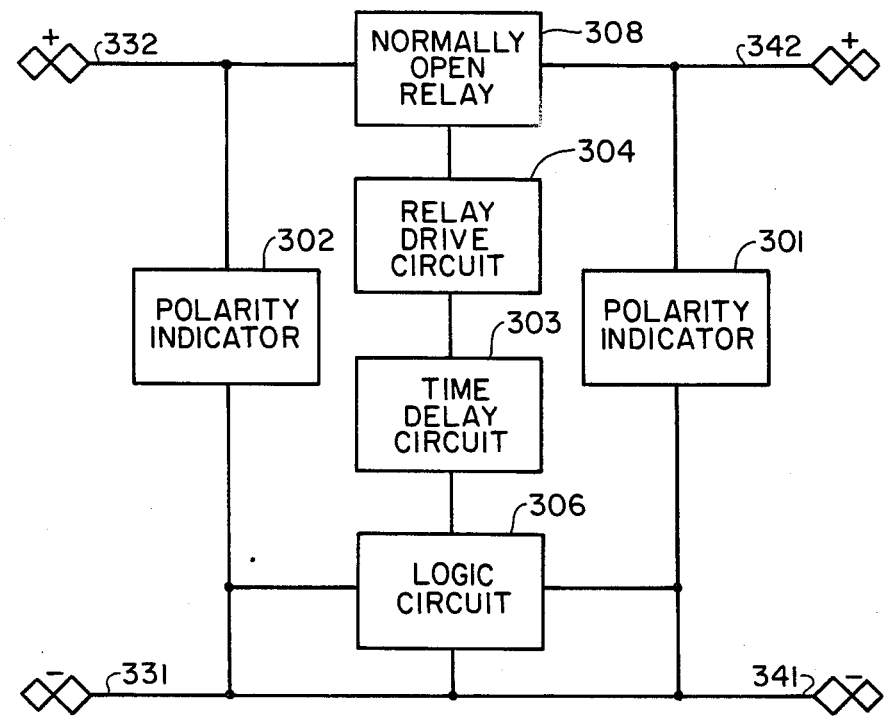
FIG. 3 is a block diagram of the preferred circuit of co-pending PCT application, U.S. 86/00876 (filed Apr. 25, 1986).
Figure 4:
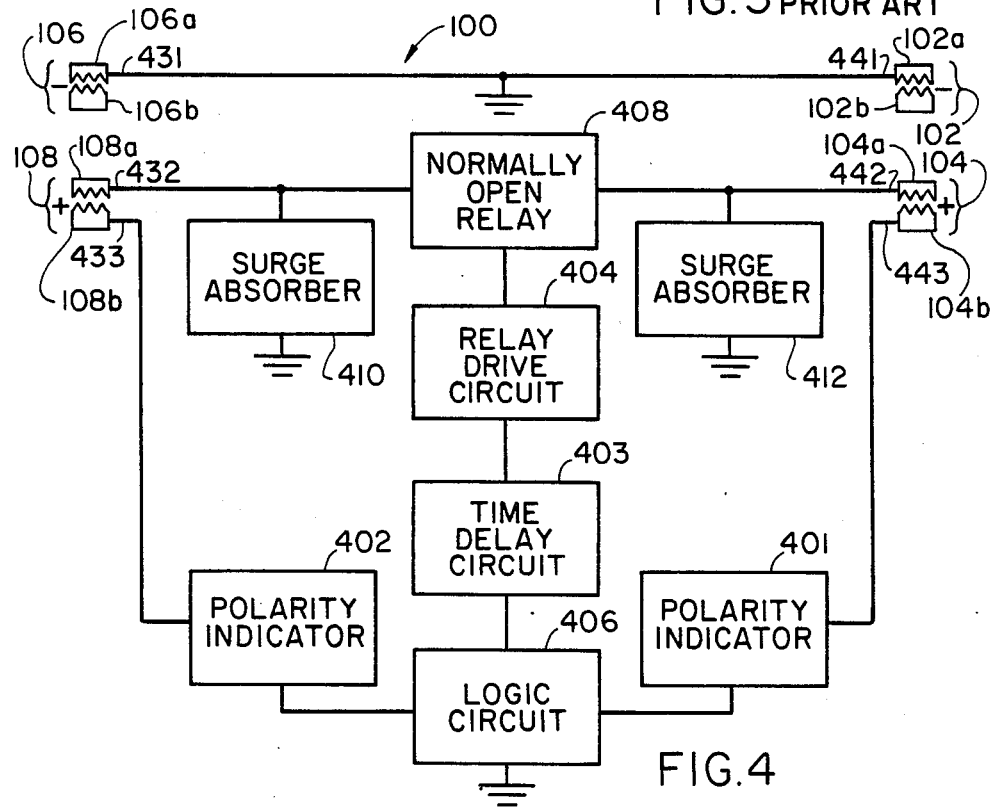
FIG. 4 is a block diagram of the control circuit of this invention.

The concepts of this invention are evident in both the configuration of the cable connectors of the assembly of FIG. 1 and in the comparison of the block diagram of FIG. 4, to most relevant prior art which is illustrated in FIGS. 2 and 3.

Preliminary to discussion of these inventive concepts, it is important to once again note that the combination of hardware and electronic circuitry of this invention represent a substantial departure from the prior art and from the assemblies depicted in FIGS. 2 & 3. More specifically, the capabilities of the present assembly could not and would not have been realized by simple substitution or addition of circuitry to the prior art systems. The instant invention requires, for its successful implementation, a fundamental departure from the conventional cable connector design. This radical departure from conventional cable connector design not only provides the basis for the enhanced safety features of this invention, but also permits their implementation with existing technology.

As is evident in FIG. 1, all of the cable connectors (102, 104, 106, 108) of the assembly (100) of this invention are illustrated in a normally open position. In practice, only the connectors which are affixed to the positive terminals of the power supply and to the battery need conform to this design. This novel design insures that the opposing jaws of the cable connectors are both physically and electrically isolated from one another and remain physically and electrically isolated from one another when not in contact with a terminal post of either the power supply or the battery to be recharged. Thus, if and when a cable connector is inadvertently or deliberately removed, from a positive terminal of either the power supply or the battery during the flow of current from one to the other, the opposing jaws of the clamps will remain remote from one another, thereby alerting the control circuitry of the assembly to an unsafe condition. The control circuitry (120) thereupon, and in real time (less than 200 milliseconds), effects opening of a relay, thereby interrupting current flow and minimizing arcing between the clamp and the terminal.

FIG. 4 provides a block diagram illustrating the control circuitry of the assembly of this invention and its relationship to the cables and cable connectors of the assembly. As is readily apparent, the circuitry configuration depicted in FIG. 4 illustrates a number of unique relationships which in turn provide safety features which have heretofore unavailable in such systems. More specifically, the cable which connects the positive terminals of the power supply and battery to be recharged is, in fact, composed of two (2) conductors (432, 442; and 433, 443). In addition, each terminal clamp (104, 108) on the terminal ends of the conductor is, in turn, separated from its counterpart on the opposing end of the conductor by one or more electrical components which effectively interrupt the flow of current through both of the conductors until certain specific conditions are satisfied.

In practice the individual with a dead battery will simply connect the cable connectors (102, 104, 106, 108) on the terminal ends the assembly conductors (431, 441; 432, 442; 433, 443) to the terminals of both the DC power supply and to the dead battery. It is assumed, for the purposes of illustration, that such cables will be installed properly; and, that the positive terminal of the DC power supply and the positive terminal of the battery will be connected to the appropriate terminal clamps of the assembly (104, 108); and, that the negative terminal (ground) of the DC power supply and the negative terminal (ground) of the battery will be connected to the appropriate terminal clamps (102, 106). In the event that the cable/terminal connections are improperly made, the polarity indicators (401, 402) will reflect this conditon (i.e. fail to light up—in the case of light emitting diodes).

Where such connections have been properly made, these same polarity indicators (401, 402) will also reflect this condition (ie. light up in the case of light emitting diodes), thereby alerting the user to the imminent flow of current through the cable assembly. In order to reduce the liklihood of arcing during this initial installation of the cable connectors, a time delay circuit (403, 404) has been provided to impose a finite hiatus between the generation of a relay activating signal by the logic circuit (406) and the closing of the normally open relay (408).

Even after the appropriate contacts have been established and current begins to flow through the cables of the assembly, the system logic of the control circuit (406) continuously monitors the continuity of contact of the cable connectors (104, 108) at the positive terminals of the DC power source and the battery. In the event one of these connections becomes disconnected from either of these terminals during the charging cycle, the system logic will, in real-time, turn off the relay drive circuit (404), thus, opening the relay (408). In the context of this invention, the phrase "real-time" is intended as descriptive of the combined response time of the components of the logic and relay drive circuitry upon sensing of a lack of continuity in current flow through the conductors connecting the positive terminals, the subsequent processing of such input, the communication of the appropriate electrical response from the logic circuit (406) to the relay drive circuit (404) and the opening of the relay (408). With the components presently available, this combined response time is generally less than about 200 milliseconds. This ability of the assembly to essentially immediately interrupt the flow of current between the positive terminals of the power supply and the battery is unique to the assembly of this invention. This capability effectively reduces the liklihood of explosion of the combustible gases in the vicinity of the battery to a level previously unattainable.

Figure 5:
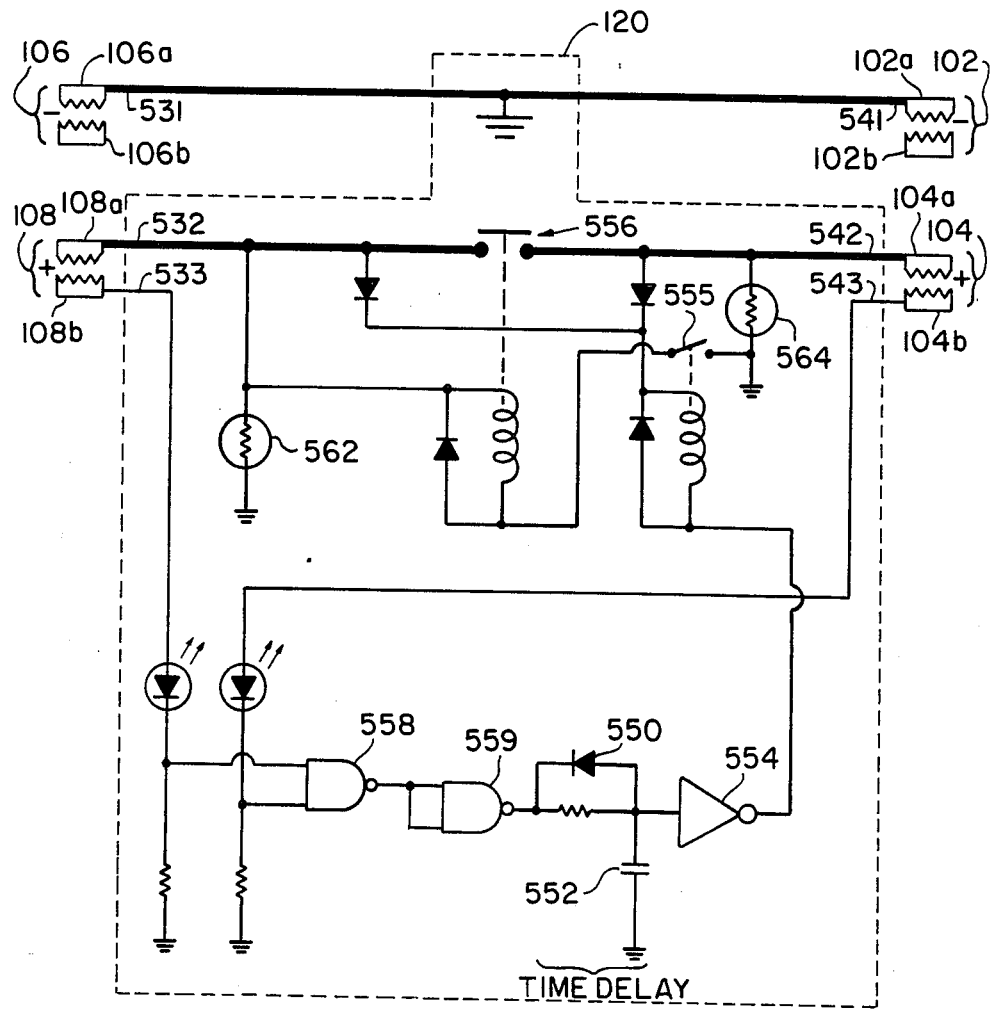
FIG. 5 is a circuit diagram for implementation of the block diagram of FIG. 4.

In the embodiment of this invention illustrated in wiring diagram of FIG. 5, the logic circuit (558, 559) requires two (2) high inputs to have a high output and close the normally open relay (556). If either connector (104, 108) is inadvertently removed or becomes loose from a positive terminal, a low will be applied to one input of the AND circuit and the relay will open. A diode (550) has been incorporated in the time delay circuit so that the capacitor (552) can quickly discharge, thus turning off the relay drive circuitry and opening the relay (556). The AND gate function of the logic circuit is performed by two (2) NAND gates (558, 559), the second (559) acting as an inverter, therefore, the combination performing the logic AND function.

A Schmidt trigger (554) and a miniature relay (555) combine to function as a relay driver for the normally open relay (556). This circuit behavior is as follows: when both the inputs to the logic circuit are high, the output is high, the capacitor (552) begins to charge. The capacitor (552) is connected to the input of the Schmidt trigger and when the voltage across it reaches a predetermined level, the output of the Schmidt trigger goes to low. This provides a path for current through the coil of the miniature relay (555), thus closing this relay. This further provides a path for current through the main solenoid, thus closing the main relay (556) and allowing the battery to be recharged.

An additional feature has been incorporated into the control circuitry illustrated in FIGS. 4 and 5 to suppress voltage surges and thereby limit input voltage from the DC source to the battery. This is represented as surge absorbers (410, 412) in FIG. 4 and as varistors (562, 564) in FIG. 5.

The foregoing description is illustrative of the principles and operation of this invention. It is to be understood that additional embodiments of this invention may be constructed utilizing different mechanical and electrical components in accordance with these principles without departing from the spirit or the scope thereof.

What is claimed is:

1. A booster cable assembly for charging a relatively power deficient battery from a DC power source, said assembly comprising:
    (a) a conductor cable for connection of the negative terminal of the DC power source to the negative terminal of the relatively power deficient battery, each end of said conductor cable being connected to said terminal by a conventional cable connector at the terminal ends of said conductor;
    (b) a pair of conductor cables for connection of the positive terminal of the DC power supply to the positive terminal of the relatively power deficient battery, each end of the each conductor cable of said pair being connected to said terminal by an unconventional cable connector at the terminal ends of each conductor cable of said pair, said unconventional cable connector having a normally open jaw and each jaw comprising a pair of electrically conductive elements for contact with the positive terminals of the power source and of the relatively power deficient battery, one of said pair of conductor elements from each of said unconventional cable connector being connected to one of said pair of conductor cables at the terminal end of each of said conductor cables of said pair; and
    (c) power transfer control circuitry connected between the terminal ends of said pair of conductor cables for control of the flow of power from the DC power source to the relatively deficient battery, said power transfer control circuitry including (i) a normally open relay along one of the conductor cables of the conductor pair; (ii) means connected to the other of the conductor cables of the conductor pair, for sensing the appropriate connection of each of the cable connectors of the pair of conductor cables to the positive terminals of the DC power source and of the relatively deficient battery; (iii) means for sensing the disconnection of a cable connector of one of the conductor pair and one of the positive terminals; and (iv) logic circuitry for (1) producing an activating signal to the normally open relay when the appropriate connections between the power source and the battery have been made, thereby closing the relay and completion of the power transfer control circuit; and (2) producing an inactivating signal upon sensing of disconnection of a cable connector from the positive terminal of either the power source or the relatively power deficient battery, thereby opening the relay and interrupting, in real-time, the transfer power from said source to said battery.

2. The assembly of claim 1, wherein the cable connectors on the terminal ends of the conductor cables for the negative terminals are also unconventional and have normally open jaws.

3. The assembly of claim 1, having a pair of surge suppressors, one such suppressors being connected between the normally open relay and each of the cable connectors for the positive terminals of the DC power source and the relatively power deficient battery.

4. The assembly of claim 3, where the surge suppressors are varistors.

5. The assembly of claim 1, wherein the activating signal from the control circuit logic to the normally open relay is delayed for a finite interval prior to the flow of current, in order to insure solid connection between the positive terminals of the power supply and of the battery with their corresponding cable connectors.

6. The assembly of claim 1, wherein the logic circuit comprises two NAND gates, one of said gates acting as an invertor, thereby performing a logic AND function.

7. A method for real time control of power transfer through a booster cable assembly to a DC power source to a battery which is being recharged from the power source, said method comprising:

(A) providing a booster cable assembly for charging a relatively power deficient battery from a DC power source, said assembly comprising:

(1) a conductor cable for connection of the negative terminal of the DC power source to the negative terminal of the relatively power deficient battery, each end of said conductor cable being connected to said terminal by a conventional cable connector from the terminal ends of said conductor;

(2) a pair of conductor cables for connection of the positive terminal of the DC power supply to the positive terminal of the relatively power deficient battery, each end of the each conductor cable of said pair being connected to said terminal by an unconventional cable connector from the terminal ends of each conductor cable of said pair, said unconventional cable connector having a normally open jaw and each jaw comprising a pair of electrically conductive elements for contact with the positive terminals of the power source and of the relatively power deficient battery, one of said pair of conductor elements from each of said unconventional cable connector being connected to one of said pair of conductor cables at the terminal end of each of said conductor cables of said pair; and (3) power transfer control circuitry connected between the terminal ends of said pair of conductor cables for control of the flow of power from the DC power source to the relatively deficient battery, said power transfer control circuitry including (i) a normally open relay along one of the conductor cables of the conductor pair; (ii) means connected to the other of the conductor cables of the conductor pair, for sensing the appropriate connection of each of the cable connectors of the pair of conductor cables to the positive terminals of the DC power source and of the relatively deficient battery; (iii) means for sensing the disconnection of a cable connector of one of the conductor pair and one of the positive terminals; and (iv) logic circuitry for (a) producing an activating signal to the normally open relay when the appropriate connections between the power source and the battery have been made, thereby closing the relay and completion of the power transfer control circuit; and (b) producing an inactivating signal upon sensing of disconnection of a cable connector from the positive terminal of either the power source or the relatively power deficient battery, thereby opening the relay and interrupting, in real-time, the transfer power from said source to said battery; and (B) controlling the flow of power through the assembly to prevent arcing between the cable connectors of the assembly and the positive terminals of the power supply and the battery.

* * * * *